United States Patent

Morrison et al.

[11] Patent Number: 5,918,031
[45] Date of Patent: Jun. 29, 1999

[54] COMPUTER UTILIZING SPECIAL MICRO-OPERATIONS FOR ENCODING OF MULTIPLE VARIANT CODE FLOWS

[75] Inventors: Michael J. Morrison, Santa Clara; Andrew Paul Kelm, Fremont; Nazar A. Zaidi; Bharat N. Zaveri, both of San Jose, all of Calif.

[73] Assignee: Intel Corporation, Santa Clara, Calif.

[21] Appl. No.: 08/769,068

[22] Filed: Dec. 18, 1996

[51] Int. Cl.[6] ....................................................... G06F 9/30
[52] U.S. Cl. ........................... 395/384; 395/385; 395/595
[58] Field of Search ..................................... 395/384, 385, 395/386, 388, 389, 391, 568, 595, 598, 800.23

[56] References Cited

U.S. PATENT DOCUMENTS

| | | | |
|---|---|---|---|
| 5,113,503 | 5/1992 | Sasaki et al. | 395/388 |
| 5,220,656 | 6/1993 | Itomitsu et al. | 395/387 |
| 5,222,244 | 6/1993 | Carbine et al. | 395/800.41 |
| 5,321,821 | 6/1994 | Itomitsu et al. | 395/386 |
| 5,438,668 | 8/1995 | Coon et al. | 395/380 |
| 5,481,684 | 1/1996 | Richter et al. | 395/388 |

*Primary Examiner*—Krisna Lim
*Assistant Examiner*—Viet Vu
*Attorney, Agent, or Firm*—Blakely, Sokoloff, Taylor & Zafman

[57] ABSTRACT

A microarchitecture that accommodates divergent instruction sets having different data sizes and addressing modes utilizes a mechanism for translating a generic flow for an instruction into specific operations at run-time. These generic flows use a special class of micro-ops (uops), called "super-uops" (or "Suops)" which are translated into a variable number of regular (i.e., simple) uops. A first-level decoder translates macroinstructions into either simple micro-ops or one or more super-uops which represent one or more sequences of one or more simple uops. A second-level decoder is responsible for converting the super-uops into the appropriate micro-op sequence based upon a set of arguments associated with the super-uop and attributes of the macroinstruction.

25 Claims, 4 Drawing Sheets

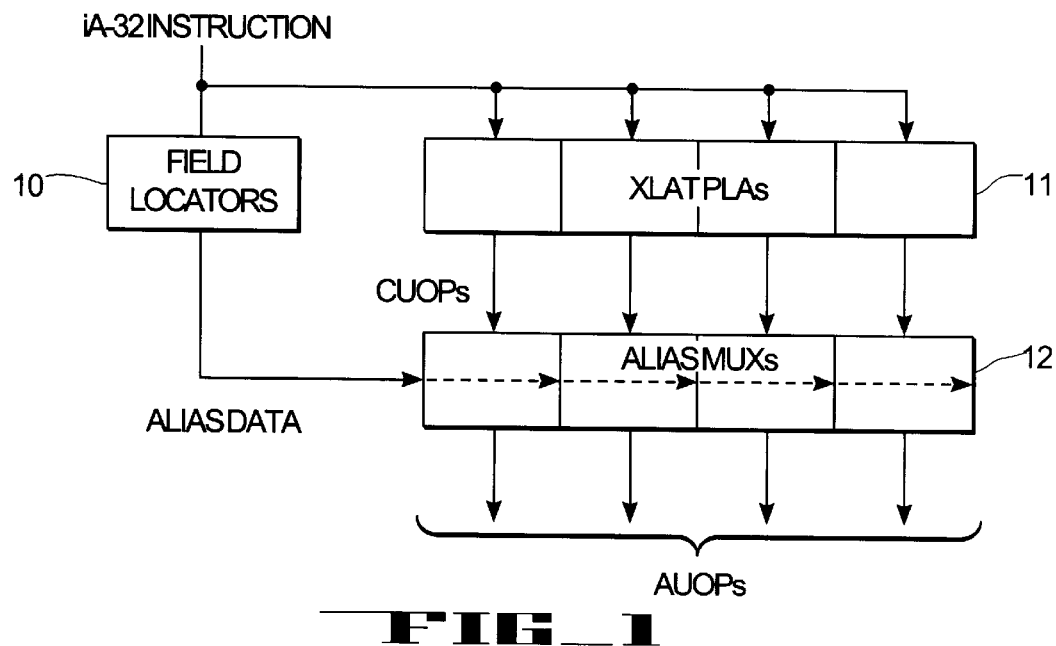
FIG_1
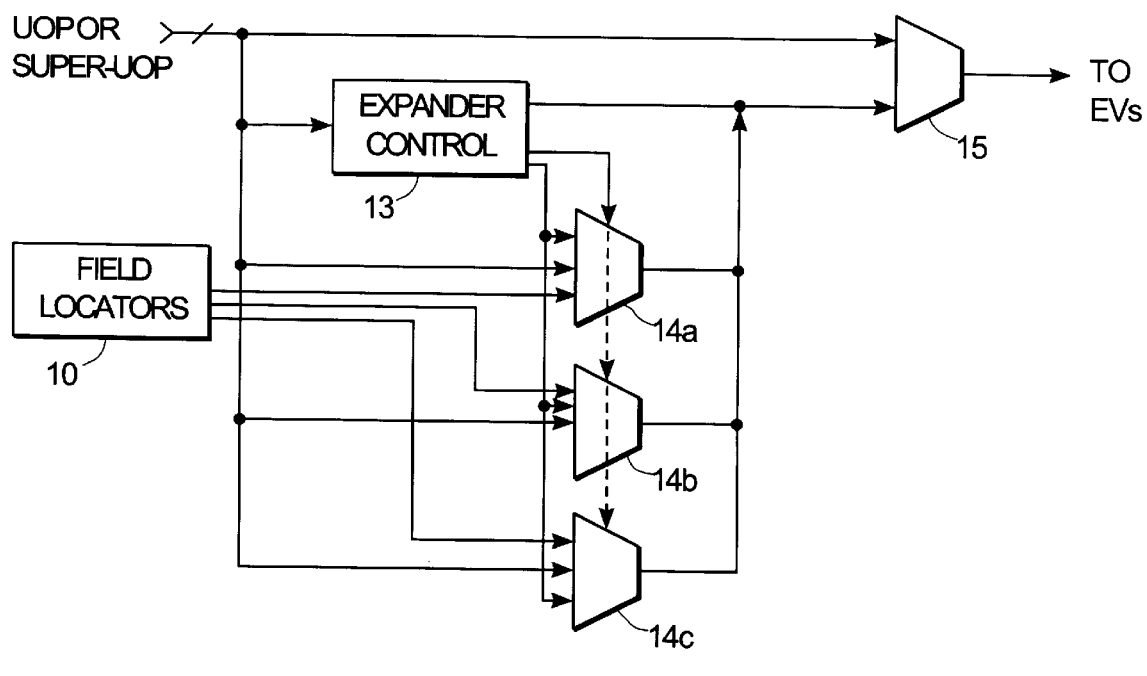
FIG_2

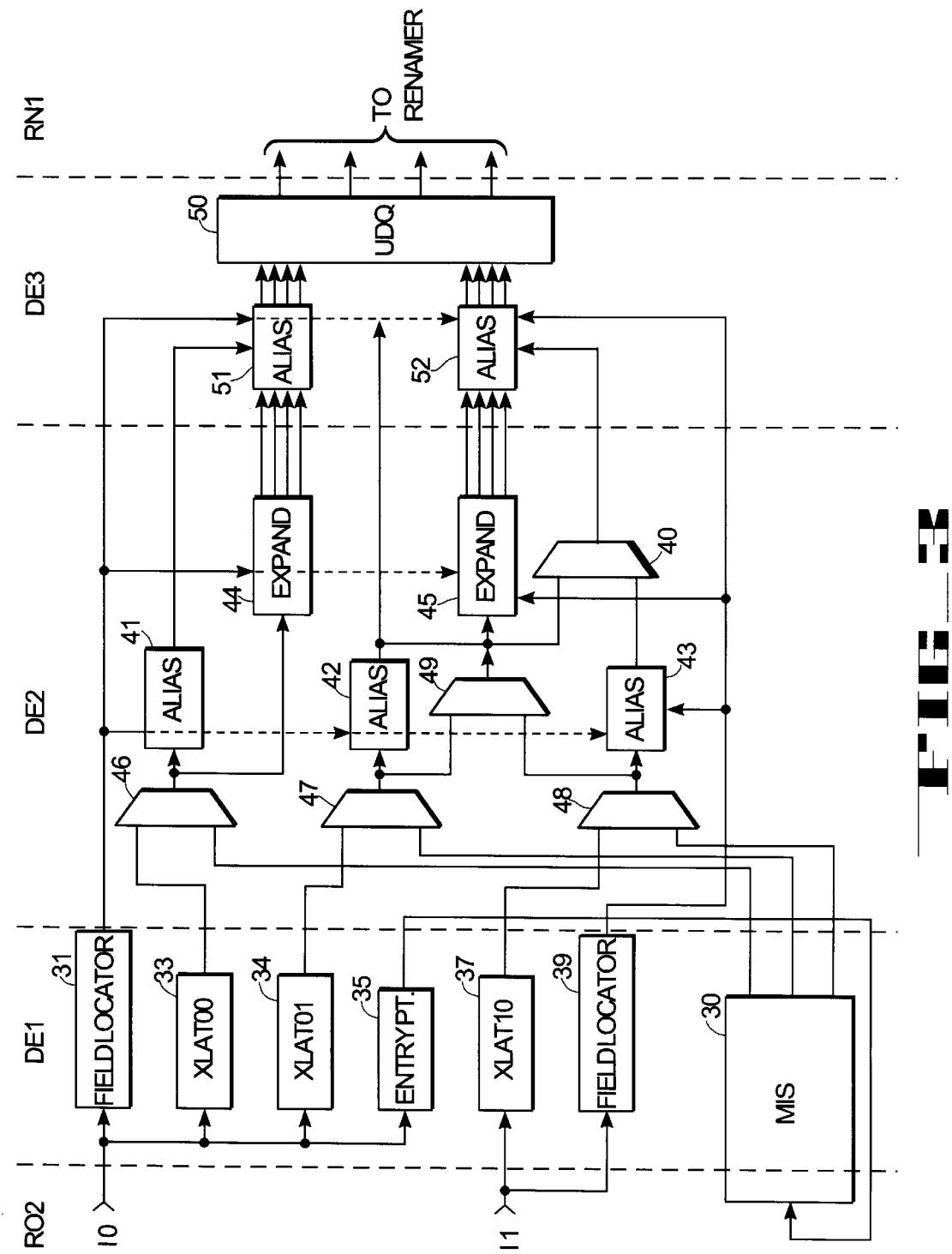

Macroinstructions: MOV Reg,mem
@Reg:=LOADMA.@asize.@dopsize.(@BASE,@INDEX,@DISP,@qpSEG)
FIG_4
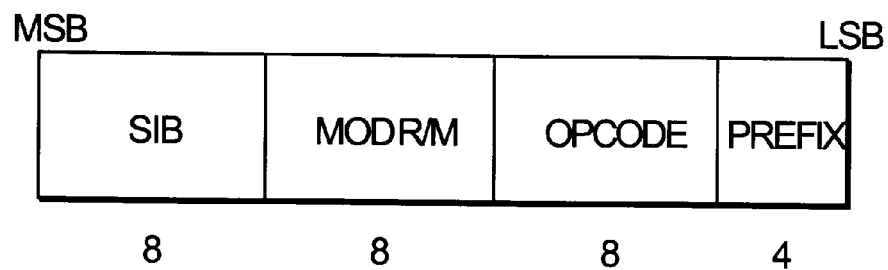
FIG_6

LOADMA_BID_r1:
TMP2_REG:=@ADDR_SCALE(R3_REG,R2_REG);
TMP2_REG:=LAGEN.@ncplxsize.@edopsize.@desc_intent(OPDESC_REG,TMP2_REG,imm_pass_thru);
TMP4_REG:=@LD.@dopsize(R0_REG,TMP2_REG),oiw;
R1_REG:=MERGE.@dopsize.src2reg(R1_REG,TMP4_REG),flow_marker(EOM);
FIG_5
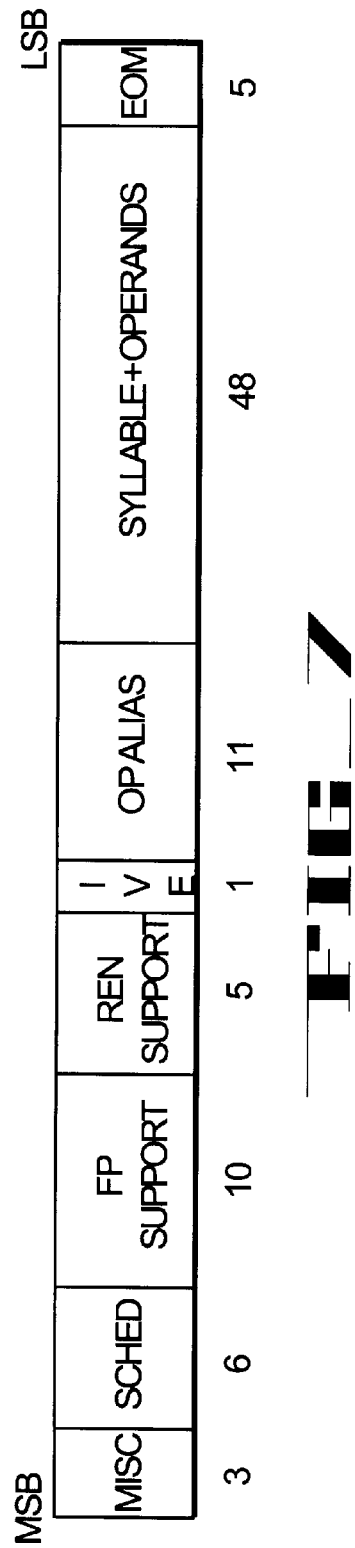
FIG_7

COMPUTER UTILIZING SPECIAL MICRO-OPERATIONS FOR ENCODING OF MULTIPLE VARIANT CODE FLOWS

FIELD OF THE INVENTION

The invention relates generally to field of computer microarchitecture. More specifically, the invention relates to apparatus and methods for decoding and translating instructions that are executed within a microprocessor.

BACKGROUND OF THE INVENTION

As many people know, computers or microprocessors operate by executing a programmed sequence of instructions. A computer instruction is a machine code that tells the computer to perform a particular operation. In this respect, every computer is designed to operate in accordance with a defined instruction set architecture (ISA). Unfortunately, most computers are limited to running programs that are only compatible with a single instruction set architecture. This means that programs written using instructions from a different ISA cannot be executed on that machine.

Today, researchers face the challenge of building a computing machine that is capable of incorporating two or more widely divergent instruction set architectures onto a single piece of silicon. One of the primary problems, which must be addressed to solve this problem, is the wide semantic gap that exists between different instruction set architectures.

To better appreciate the problem faced by researchers working in the field of computer design and architecture, one must first understand the basics of how instructions are processed within the machine. The architecture of many processors implement programmed instructions—often referred to as macroinstructions—by sequences of microcode statements. That is, usually a macroinstruction is decoded by decoding logic into a sequence of microinstructions or micro-operations (conveniently termed "micro-ops" or "uops" for short). These uops are executed by the processor's core logic. By way of background, an explanation of micro-ops is provided in pending U.S. patent application Ser. No. 08/205,039, filed Mar. 1, 1994, entitled, "Computer with Distributed Program Control".

An additional factor complicating the problem is that microarchitectures associated with different ISA's are constrained to work within the boundaries of instructions having particular sizes. Decoding and executing instructions from widely divergent ISAs therefore requires many different microcode flows. Due to the great dissimilarities between different instruction set architectures, the amount of microcode required to accommodate and express all of the various instructions explodes beyond reasonable proportions. This, in turn, translates directly into an excessively long microcode development time.

Thus, there exists a need for an apparatus and method for implementing a particular instruction set on a machine that was not designed specifically for that purpose. To put it another way, there is a need for a mechanism that would simplify and shorten the microcode development process for a machine that could execute instructions from different ISAs. Ideally, the machine should be implemented without incurring the significant amount of silicon die area that would be required to implement widely-divergent instructions sets by simply taking a "brute force" approach to the problem.

SUMMARY OF THE INVENTION

The present invention solves the aforementioned problems inherent in the prior art by providing a microarchitecture that accommodates divergent instruction sets having different data sizes and addressing modes.

A central aspect of the present invention is a newly created mechanism for translating a generic flow for an instruction to specific operations at run-time. These generic flows use a special class of micro-ops (uops), called "super-uops" (or "Suops)" which are translated into a variable number of regular (i.e., simple) uops. The concept of super-uops is a radical innovation as it allows the representation of microcode sequences common to many instructions in a single encoding.

In one embodiment, the computer of the present invention utilizes a two-level decode scheme. The first-level decoder translates macroinstructions into either simple micro-ops or one or more super-uops which represent a sequence of one or more simple uops. A second-level decoder is responsible for converting the super-uops into the appropriate micro-op sequence based upon a set of arguments associated with the super-uop and attributes associated with the macroinstruction. For example, a LOAD super-uop may be expanded into one of six possible flows, depending upon arguments such as operand size, addressing mode, etc. An execution unit within the computer then executes the flow of uops generated by the first and second decoding units.

As will be appreciated by practitioners in the art, the two-level decoding scheme of the present invention is advantageous in many ways. First, common microcode sequences, such as that for a simple LOAD and STORE, can be collapsed into a single Suop. Depending upon how many uops are collapsed and how common the sequence is, the overall savings in silicon die area and microcode size can be very significant.

A further advantage is that similar flows may be collapsed into a single super-uop. For example, LOADs using different "base+displacement" addressing modes typically have a different microcode sequence than LOADs using "base+index+displacement" addressing modes. By using a single super-uop to represent both flows, and inserting the appropriate flow dynamically at decode time (based on the addressing mode used by the macroinstruction), the total number of microcode flows which is written and stored within the computer is reduced considerably.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 1 is a simplified block diagram of the decoder used in the computer of the present invention.

FIG. 2 is a block diagram illustrating the structure by which special micro-operations are expanded in accordance with the two-level decoder scheme utilized in the computer of the present invention.

FIG. 3 is a functional circuit diagram of a two-level decoder according to one embodiment of the present invention.

FIG. 4 illustrates an exemplary super-uop specification for a particular macroinstruction.

FIG. 5 shows a particular micro-op sequence specified for the super-uop shown in FIG. 4.

FIG. 6 shows the translation logic array input bits specified in one embodiment of the present invention.

FIG. 7 shows the structure of an individual micro-op, including field information, according to one embodiment of the present invention.

DETAILED DESCRIPTION

A computer for executing instructions of multiple instruction set architectures utilizing a two-level decoder is disclosed. In the following description, numerous specific details are set forth such as instruction types, fields, bit sizes, etc., in order to provide a thorough understanding of the present invention. However, it will be understood by one skilled in the art that the present invention may be practiced without these specific details. In other instances, well-known methods, procedures, components, and circuits have not been described in detail to avoid obscuring the invention.

As explained above, the primary problem in building a computer that incorporates two widely-divergent instruction set architectures is the wide semantic gap between the two instruction sets. The present invention accommodates the great similarities that commonly exist between different instruction set architectures by creation of an innovative mechanism that translates a generic flow for an instruction to specific operations at run-time. The generic flows use a special class of micro-operations (uops) called "super-uops" (Suops).

Micro-operations represent one or more individual primitive operations which comprise the operation specified by a macroinstruction. That macroinstructions may be decomposed into one or more individual operations or instructions. In this sense, microcode, in its basic form, is simple a collection of micro-ops which are individual instructions or syllables. A super-uop, on the other hand, is a uop that can be expanded to a plurality of simple, or regular uops by expansion logic. In other words, Suops are translated into a variable number of regular uops. Thus, the mechanism of Suops simplifies and shortens microcode development process. More importantly, Suops allow a significant savings in the amount of die area that would normally be required to implement multiple divergent instruction set architectures. It will be appreciated by practitioners in the art, that the ability to map common microinstruction sequences into a single Suop leads to considerable microcode savings.

FIG. 1 is a block diagram of a decoder useful in converting a macroinstruction into a sequence of generic micro-ops. By way of example, FIG. 1 illustrates a 32-bit instruction compatible with Intel Corporation's well-known instruction set architecture, commonly known as the Intel Architecture™ (iA). In the decoder of FIG. 1, a plurality of translation programmable logic arrays (XLAT PLAs) 11 are utilized to convert iA-32 macroinstructions into a sequence of generic micro-ops. Each XLAT PLA produces a single micro-op, which are referred to in FIG. 1 as Cuops. The Cuops output by the XLAT PLAs are in a format most compatible with the execution units of the implementation's microarchitecture. In one embodiment, four XLAT PLAs are organized as a 28 (input)×88 (output) array. The inputs are shown in FIG. 6 (SIB refers to the scale/index byte, and the prefix may include information such as address size, data size, lock prefix, etc.).

It is appreciated that the width of the Cuops, as well as the inputs to the XLAT PLAs, may be reduced or altered by various optimizations. Furthermore, a particular implementation of the instruction decoder shown can be built using any number of XLAT PLAs. Decoders with many XLAT PLAs are capable of decoding more complex instructions than those with lesser numbers of PLAs. An example of the Cuop structure for a specific embodiment of the present invention, starting from the most significant bit position, is shown in FIG. 7.

With continuing reference to FIG. 1, to minimize PLA size, the present invention specifies some arguments of the Cuops through a method known as "aliasing". Field locator logic block 10 is responsible for extracting information from the attributes of the macroinstruction, which is then used during aliasing. The alias data is input to alias multiplexers 12 along with the Cuops from the XLAT PLAs. The alias MUXes replace generic arguments and options in the Cuops with specific information from the macroinstruction. The final result is a sequence of uops—called Auops—which is in form suitable for execution by the rest of the machine.

Consider the iA instruction for loading an instruction from memory, which is represented as:

MOV reg, mem

This instruction might be represented by the following single uop:

@REG:=LOAD.@addrsize.@addrmode (@BASE, @INDEX, @SEGMENT, @DISP)

In the above instruction statement, each keyword prefixed by the "@" symbol means that the attributes of the macroinstruction are to be used instead of some specific value. For instance, the destination register in the above example would be the register specified in the REG field of the macroinstruction. Similarly, the addressing size (e.g., 16 or 32 bits), addressing mode, base register, index register, segment register, and displacement, are all taken from the macroinstruction.

In accordance with a particular embodiment of the present invention, uops are issued from two sources: the XLAT PLAs and a microcode read-only memory (UROM). Microcode contains both Suops and regular uops. Recall that a Suop, simply defined, is a special uop which gets translated into multiple regular uops by a set of PLAs called expanders. The expanders distinguish between the two types of uops and pass a simple uop through, unchanged, while expanding a Suop. The number of expanders required in any particular implementation is dictated by the maximum number of regular uops that a Suop can be expanded into.

FIG. 2 illustrates a typical uop expander in accordance with the present invention. In this example, each expander is shown comprising a PLA control unit 13 and a set of field multiplexers, e.g., 14a–14c. (In practice, it is appreciated that there may be many more multiplexers than what are actually shown in the example of FIG. 2.) The expander control 13 determines whether the incoming uop is a simple uop or a Suop. In the event that the incoming uop is a Suop, it additionally determines the type of the Suop. Expander control unit 13 also controls the multiplexers 14a–14c for the source and destination fields, and produces the control codes for the new uop. The multiplexers 14a–14c also receive as inputs data provided by Field Locators 10 and the expander PLA control unit 13.

Note that the output of the expander control PLA 13 is combined with the outputs of each of the field MUXes 14 to produce a uop that is sent to the execution units of the computer. In the case of a first expander of a set, there is an additional multiplexer 15 to select between the original incoming uop (if it is a regular uop) and the newly formed uop (in the event the original uop is a Suop).

To implement the concept of Suops, the computer of the present invention utilizes a two-level decoder. By way of example, a two-level decoder for converting iA-32 instructions into iA-64 instructions is shown in FIG. 3. The functional circuit diagram of FIG. 3 includes vertical-lines indicating signal timing through the various pipeline stages of the computer of the present invention. These pipestages are labeled with abbreviated names at the top of the page. For instance, DE1 refers to the first decoding pipestage associated with the first level of the instruction decoder. Second-level decoding occurs in pipestages DE2 and DE3. On the other hand, RO2 represents the pipestage immediately preceding instruction decoding, and specifically refers to operations performed by the instruction rotator in the computer of the present invention. Likewise, the pipestage labeled RN1 has to do with post-decoding operations, such as register renaming, etc.

Generally speaking, the first-level decoder takes a macroinstruction associated with a particular instruction set architecture and decodes it into a sequence of uops. Each uop stored in the first-level decoder can either be a simple uop or a Suop that represents one or more sequences of one or more simple uops. The second-level decoder is responsible for converting Suops into the appropriate simple uop sequence.

Practitioners in the computer arts will appreciate that the two-level decoder employed in the computer of the present invention provides many advantages. First, common microcode sequences, such as that for a simple LOAD or STORE can be collapsed into a single uop. Depending upon how many uops are collapsed and how common the sequence is, the overall savings in XLAT PLA and UROM size can be considerable.

Another advantage is that similar flows can be collapsed into a single Suop. For example, LOADs using base+ displacement addressing modes have a different microcode sequence than LOADs using base+index+displacement addressing modes. By using a single Suop to represent both flows, and inserting the appropriate flow dynamically at decode time (based on the addressing mode used by the macroinstruction) the total number of microcode flows which must be written and stored is dramatically reduced.

Finally, the two-level decode scheme allows storage of almost all common instructions in the primary decode PLAs. Access to the UROM, which incurs a two-clock cycle penalty, is only required for a small percentage of instructions. According to a more traditional decoder approach the number and size of the PLAs required would be excessive. Thus, the mechanism of Suops compactly represents multiple variances of the same types of instructions with a single entry in the main decoder.

Referring once again to FIG. 3, up to two iA-32 macroinstructions may be processed per clock cycle in the embodiment shown. The operation of the decoder FIG. 3 is as follows. Macroinstructions are provided to the instruction decoder in pipestage R02. For instance, a first macroinstruction (I0) is shown being provided to a pair of XLAT PLAs 33 and 34, labeled XLAT00 and XLAT01, and also to field locator 31 and entry point PLA 35. These elements collectively comprise the first level of the decoder. The XLAT PLAs 33 and 34 receive as inputs, opcode bytes from the first macroinstruction.

Each XLAT PLA produces a single uop at its output. For example, XLAT00 and XLAT01 would produce first and second uops, respectively, in a sequential flow. It should be understood that a particular implementation shown in FIG. 3 is capable of decoding any macroinstruction which comprises one or two micro-ops in length. In the case where an instruction decodes into sequences of micro-ops that are longer than two in length, the microcode ROM in the micro-instruction sequencer (MIS) 30 provides the appropriate micro-op flow.

Field locator 31 includes logic for examining the macroinstruction op-code bytes and extracting information specific to the instruction. Note that field locator 31 is associated with XLAT PLAs 33 and 34, whereas field locator 39 is specifically associated with XLAT PLA 37. As an example of the type of attribute information extracted by field locator block 31, information such as the destination register, source register, addressing size, operand size and addressing mode, may be obtained from the macroinstruction. This attribute information is used later in the DE2 pipestage.

The entry point PLA comprises logic used for complex instructions that decompose into more than two micro-ops.

The second instruction decoder embodied in the XLAT PLA 37 is labeled XLAT10. This second decoder permits decoding of a second instruction (I1) in parallel in the first instruction (I0) in the computer of the present invention. As such, it has its own associated field locator logic block 39. Note that in the embodiment of FIG. 3, XLAT PLA 37 is only capable of decoding simple instructions comprising a single uop.

At the beginning of the DE2 pipestage up to three Cuops are provided per clock either from XLAT PLAs 33, 34 and 37 or from MIS 30. Note that like the Cuops generated by the XLAT PLAS, the Cuops stored in the UROM may be regular uops or Suops. Multiplexers 46, 47 and 48 are utilized in the second decode stage to select the regular uops or Suops provided by the DE1 stage from either the XLAT PLAs or the microcode ROM. The output of multiplexers 46–48 is provided to alias multiplexers 41–43, respectively. These alias MUXes take the attribute information extracted by the field locators from the macroinstruction and substitute that information into the arguments of the Cuops.

Field locators 31 and 39 each include logic for every one of the various aliases. The alias MUXes essentially interpret the generic encoding associated with the Cuop and replace it with a specific encoding using the information provided by the field locators. Because there are up to three Cuops they could processes per cycle, each has its own associated alias multiplexer.

It should be appreciated that the alias MUXes allow storage of information as compactly as possible in both the MIS 30 and the XLAT PLAs 33, 34 and 37. This permits the use of the same generic microcode flow with the DE1 pipestage decoders for a variety of different forms of a particular instruction. In other words, the same microcode flow may be invoked regardless of the particular addressing size (e.g., 16 or 32-bit instructions), whether or not indexing address modes are used or any other various register and operand combinations. To put it another way, the exact same microcode flow can be used for both 8, 16 or 32-bit instructions without having to store multiple different possible encodings.

Also shown in the DE2 pipestage are expanders 44 and 45 (corresponding to expander control unit 13 of FIG. 2). The expanders comprise PLA logic that is responsible for translating a Suop, which is stored in the first-level decoder, into a sequence of simple uops. The expanders also receive some attribute information from the field locators such as addressing mode, operand size, etc. Hence, the expanders take a Suop opcode with its arguments from the XLAT PLAs and combine it with attribute information about the macroinstruction extracted by the field locators to generate a sequence of one or more micro-ops that represent the single Suop.

It should be further understood that in the cases where the XLAT PLAs generate a regular or simple uop, the outputs of the alias multiplexers are immediately forwarded to the DE3 pipestage; that is, there is no need for expansion. In such situations, the outputs of the alias multiplexers are the actual uops passed to the back-end of the machine.

In the embodiment of FIG. 3, expanders 44 and 45 are shown each comprising four expand PLAs with associated expand alias MUXes 51 and 52 (corresponding to multiplexers 14a–14c in FIG. 2). The expand PLAs take as inputs a small number of bits from the Cuops along with attribute information of the macroinstruction from the field locators. The output of the expand PLAs is a sequence of up to four simple uops. The uops generated by the expand PLAs are passed to the expander alias MUXes 51 and 52. These alias MUXes are similar to the alias MUXes 41–43 used by the Cuops, but are considerably less complex. The reason for additional alias MUX multiplexers 51 and 52 is that the output of the expander PLAs typically specify operands that are themselves aliased. For example, within each expand PLA there is no information about the destination of an instruction so that some sort of aliasing is often required to insert the correct register location. What this means is that the outputs of the expander PLAs are still in somewhat of a generic form.

Finally, the sequences of simple micro-ops are placed into a micro-op decoupling queue (UDQ) 50. In one implementation, the UDQ 50 comprises a twenty entry first-in-first-out (FIFO) queue which feeds the out-of-order execution engine of the computer processor at a rate of up to four uops per clock cycle. The four uops output by UDQ 50 are shown being passed to dependency determination units associated with the next RN1 pipestage.

To better understand the operation of the present invention, consider the example illustrated in FIGS. 4 and 5. FIG. 4 shows the basic iA instruction, MOV reg, mem which loads data from a memory location (mem) into a register (reg).

In the DE1 pipestage, the MOV macroinstruction is translated into the Suop:

@Reg:=LOADMA.@asize.@dopsize.(@BASE, @INDEX, @DISP, @qpSEG)

Note that the items prefixed with the "@" symbol for a given line of microcode are aliased. That is, according to the present invention, they are not specified directly in the Cuop, but instead specific information—particular to the operations being performed—is provided from the attributes of the macroinstruction via the field locators. Let us assume that the form of the MOV instruction is:

MOV bx, (bp+si)

where bx, bp and si are all registers. Continuing with the example, after aliasing in the DE2 pipestage, the output of the aliasing multiplexer for this particular example is represented as:

bx=LOADMA, asize 16, dopsize 16 (bp, si, 0, ss)

As is shown above, the addressing size is 16-bits, the operand size is 16-bits, and the displacement is zero (stack segment is not specified). At this point, all the aliases are resolved into actual meaningful quantities.

This information is then provided to an expander PLA which determines which of a number of different possible expansions is specified by the attributes associated with the macroinstruction and the arguments of the Suop. In this example, the important attributes include the addressing mode and the operand size of the destination. FIG. 5 illustrates the correct expansion for the LOADMA Suop. As can be seen, the Suop is expanded into a microcode flow of four simple uops. Further aliasing is performed by the aliasing multiplexers in the DE3 pipeline stage. Basically, the alias multiplexers provides particulars for anything prefixed with an "@" sign—which may even involve swapping in different instructions. in this situation, the aliasing that occurs in the third decode pipestage takes the resolved operands and inserts the appropriate register locations (e.g., bp for R2, si for R3, etc.).

It is important to recognize that the Suop specified in the above example may be expanded into different microcode sequences. For example, the LOADMA Suop expands to the following sequence of uops in the case where the LOAD is to a full (32-bit) register and base-only addressing is used.

TMP2_REG := LAGEN.@mcplasize.@edopsize.@desc_intent
(QPDESC_REG, R2_REG, imm_pass_thru);

R1_REG := @LD.@dopsize(R0_REG, TMP2_REG), flow_marker
(EOM, oiw)

Persons of skill in the computer arts will appreciate that the novel mechanism of Suops provides several significant advantages over the prior art. First, Suops provide code compaction—where common sequences of instructions are collapsed down into a single uop saving both microcode and die size.

Secondly, the concept of using Suops allows similar sequences of instructions to be collapsed down to a single uop. This means that different sequences—which could be widely divergent depending upon various attributes (e.g., 8, 16 or 32-bit addressing)—can be very compactly represented in the Suop encoding. The particulars of the instruction sequence change depending upon particular attributes of the instruction. This involves the related step of aliasing. In the particular examples presented, a two-level decoder is utilized to translate the iA-32 instruction set into an iA-64 instruction sequence.

As practitioners in the art will certainly appreciate after reading the foregoing description, a computer designed in accordance with the present invention enables using Suops for frequently occurring flows of up to N-regular micro-operations with the same sequence of op-codes, where the operands differ.

We claim:

1. A computer for executing instructions of multiple instruction set architectures comprising:

a first decoder unit that decodes an instruction having attributes into a special micro-op with a set of arguments;

a read-only memory (ROM) that stores the special micro-op, the first decoder unit providing the special micro-op via a microcode lookup to the ROM;

a second decoder unit that converts the special micro-op into a particular sequence of micro-ops based on the attributes of the instruction and the set of arguments of the special micro-op;

an execution unit that executes a flow of micro-ops, the particular sequence of micro-ops being dynamically inserted into the flow of micro-ops prior to execution.

2. The computer of claim 1 wherein the attributes include an address size.

3. The computer of claim 2 wherein the attributes further include an addressing mode.

4. The computer of claim 2 wherein the attributes further include an operand size.

5. The computer of claim 4 wherein the attributes further include a base register, an index register, a segment register, and a displacement.

6. The computer of claim 1 wherein the ROM also stores sequences of micro-ops, and further comprising:
    multiplexer means for selecting between the sequences of micro-ops from the ROM and the special micro-op produced by the first decoder unit for input to the second decoder unit.

7. The computer of claim 1 wherein the first and second decoder units are configured to operate on two instructions in parallel.

8. The computer of claim 1 wherein the particular sequence comprises up to four micro-ops.

9. The computer of claim 8 wherein the second decoder unit produces the up to four micro-ops in a single clock cycle of the computer.

10. In a microprocessor for processing data according to multiple variant instructions, a method of operation comprising the steps of:
    (a) decoding a macroinstruction having associated attributes into a special micro-operation (micro-op) that represents a code sequence generic to the multiple variant instructions, the special micro-op having a set of arguments that specify a particular variant of the code sequence;
    (b) converting the special micro-op into the particular variant of the code sequence based upon the set of arguments of the special micro-op and the associated attributes of the macroinstruction; and
    (c) dynamically inserting the particular variant of the code sequence into a flow of micro-ops provided to an execution unit of the microprocessor.

11. The method according to claim 10 wherein step (b) comprising:
    replacing the set of arguments of the special micro-op with information specified by the associated attributes of the macroinstruction.

12. The method according to claim 11 further comprising the step of:
    executing the flow of micro-ops by the execution unit.

13. The method according to claim 12 wherein the associated attributes include an operand size and an addressing mode.

14. The method according to claim 13 wherein the associated attributes further include an addressing size.

15. The method according to claim 14 wherein the associated attributes further include a base register, an index register, a segment register, and a displacement.

16. The method according to claim 10 wherein steps (a), (b) and (c) are performed during an instruction decoding operation of the microprocessor.

17. A processor for executing a program of instructions comprising:
    a decoder including:
        a first decode unit that converts, in a first decode stage, a macroinstruction having attributes into a special micro-op;
        a second decode unit that expands, in a subsequent decode stage, the special micro-op into a particular sequence of micro-ops dependent upon a set of arguments specified by the special micro-op and the certain attributes of the macroinstruction;
    circuitry that dynamically inserts, in the subsequent decode stage, the particular sequence of micro-ops into a flow of micro-ops specified by the program.

18. The processor of claim 17 wherein the attributes include an operand size and an addressing mode.

19. The processor of claim 18 wherein the attributes further include an addressing size.

20. The processor of claim 19 wherein the attributes further include a base register, an index register, a segment register, and a displacement.

21. The processor of claim 17 wherein the first decode unit comprises:
    first logic means for extracting information associated with the attributes from the macroinstructions; and
    second logic means for translating the macroinstructions into the special micro-op.

22. The processor of claim 21 wherein the second decode unit comprises:
    alias multiplexers that replace the arguments specified by the special micro-op with the information extracted from the attributes of a corresponding macroinstruction by the second logic means.

23. The processor of claim 22 wherein the particular sequence of micro-ops comprises up to four regular micro-ops.

24. The processor of claim 23 wherein the second decode unit further comprises a plurality of expand programmable logic arrays that outputs the particular sequence of micro-ops in a single clock period.

25. The processor of claim 24 wherein the first and second decoders are configured to decode two macroinstructions in parallel.

* * * * *

UNITED STATES PATENT AND TRADEMARK OFFICE
CERTIFICATE OF CORRECTION

PATENT NO.    : 5,918,031                                               Page 1 of 1
DATED         : June 29, 1999
INVENTOR(S)   : Morrison et al.

It is certified that error appears in the above-identified patent and that said Letters Patent is hereby corrected as shown below:

Column 3,
Line 24, after "That" insert -- is, --.

Column 6,
Line 24, delete "PLAS" and insert -- PLAs --.

Signed and Sealed this

Sixth Day of May, 2003

JAMES E. ROGAN
*Director of the United States Patent and Trademark Office*